May 4, 1926.

A. H. JONES 1,583,468

METHOD OF MAKING ROLLERS FOR ROLLER BEARINGS

Filed March 26, 1925     2 Sheets-Sheet 1

INVENTOR.
Allan H. Jones.
BY
Cooper, Kerr & Dunham
ATTORNEYS.

May 4, 1926.

A. H. JONES 1,583,468

METHOD OF MAKING ROLLERS FOR ROLLER BEARINGS

Filed March 26, 1925    2 Sheets-Sheet 2

INVENTOR.
Allan H. Jones.
BY
Cooper, Kerr & Dunham
ATTORNEYS.

Patented May 4, 1926.

1,583,468

UNITED STATES PATENT OFFICE.

ALLAN H. JONES, OF BELLEVILLE, NEW JERSEY, ASSIGNOR TO ROLLER BEARING COMPANY OF AMERICA, OF NEWARK, NEW JERSEY, A CORPORATION OF NEW JERSEY.

METHOD OF MAKING ROLLERS FOR ROLLER BEARINGS.

Application filed March 26, 1925. Serial No. 18,346.

*To all whom it may concern:*

Be it known that I, ALLAN H. JONES, a citizen of the United States of America, residing at Belleville, in the county of Essex and State of New Jersey, have invented certain new and useful Improvements in Methods of Making Rollers for Roller Bearings, of which the following is a full, clear, and exact description.

This invention relates to rollers (for roller bearings) of the helical or coil type, preferably cylindrical on the outside, made essentially by coiling a strip of metal into the form of a helix, and its chief object is to provide a method of making a straight or tapered roller in which the turns or convolutions of the helix have a cross-sectional shape adapted to give such turns greater strength in proportion to the amount of metal used than is obtained by the usual rectangular or trapezoidal shape. Another object is to provide a rapid and efficient method of producing such rollers by causing the metal strip to assume the form indicated in the operation of coiling it into a helix. To these and other ends the invention comprises the novel features and combinations of elements and steps hereinafter described.

In the accompanying drawing.

Figure 1:
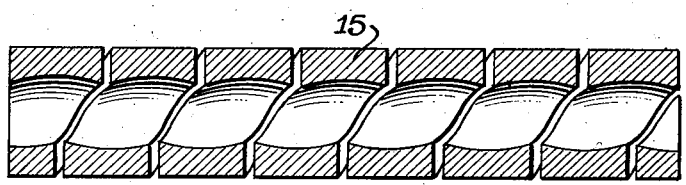
Fig. 1 is a longitudinal section of one of my improved bearing rollers.
Figure 2:
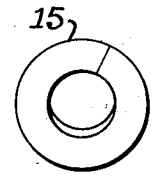
Fig. 2 is an end view of the roller shown in Fig. 1.

A straight roller of my improved type is illustrated in Figs. 1 and 2. The outer surface of the roller shown is cylindrical in form, the successive turns (one of which is designated by the numeral 15) being all of the same uniform outer diameter. The inner diameter of the individual turns varies, however, in such manner as to make the inner surface concave in every axial plane of the roller. In short the sectional contour of the turn itself is flat on the outside and arched outwardly on the inside, making its resistance to pressures tending to flatten it greater than that of a turn of the same width and of the same amount of metal but cylindrical inside as well as outside. Conversely, for equal strength my roller requires less metal. An important economy is thus obtained in the manufacture of roller bearings in large quantities.

Figure 3:
Fig. 3 is a cross section illustrating the shape of the strip with which the operation may start.

My improved roller may be made from a strip of metal of suitable cross section, preferably rectangular as indicated at 16 in Fig. 3. The strip is fed through a guide 17 by means of feeding rollers 18, 19, Fig. 5, driven in any convenient way, not shown, into the space defined by suitable coiling rollers of conical form, which may be three in number as shown at 20, 21, 22, with their axes making suitable angles with the axis of the helix which is to be produced. One or more of these coiling rollers may be positively rotated by any convenient means. If only one is driven I prefer it to be roller 20, as by means of the pinion 24, Fig. 7. The feed rollers 18 and 19 are shaped on their peripheral faces as shown in Fig. 6, roller 18 being convex and roller 19 being concave, so that the cross section of the strip 16 is changed from the rectangular form shown in Fig. 3 to the bowed or arched form shown at $16^a$, Fig. 4, which is a section on line 4—4 of Fig. 5.

A few turns of coils having been made by hand or otherwise, to begin the coiling operation, the strip as it is advanced by the feeding rollers meets the roller 20 and is bent upwardly. At this roller the pressure on the advancing strip is exerted inwardly on the crown of the arch, as indicated by the arrow a, Fig. 5, so that the roller not only curls the strip toward the helical form but also tends to flatten the arch. As the strip coils, the inner portion of the metal, conforming to a shorter circumference than the outer portion, tends to contract (shorten) longitudinally of the strip and to widen transversely; while the outer portion, conforming to a longer circumference, tends to stretch (lengthen) longitudinally and contract transversely. The effect of the contracting and stretching tendencies, combined with the pressure of the roller on the arch, is to bend the edges of the strip outwardly, as indicated by the small arrows in Fig. 7 (which shows at 20ª a half-turn of the helix), with the result that the arch is flattened more on the outside than on the inside. At the same time the strip is thinned at the center.

Figure 8:
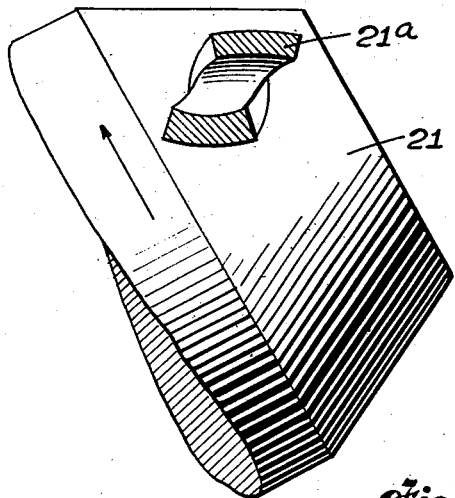
Figure 9:
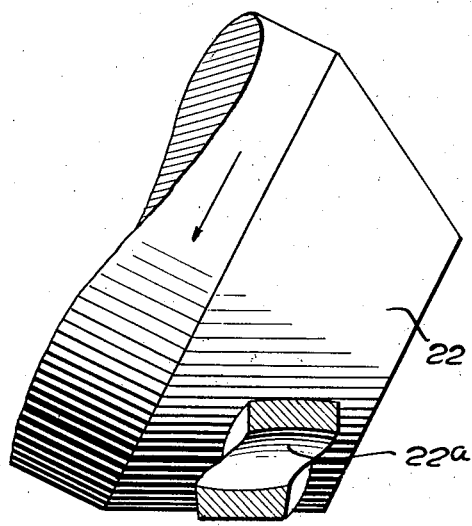

Meeting roller 21 (see also Fig. 8, in which a half-turn of the helix is shown at 21ª) and then roller 22 (see also Fig. 9, where a half-turn of the helix is shown at 22ª), the strip is subjected to further radial bending, longitudinal stretching, transverse contracting, flattening and intermediate thinning, with the result that when the helix leaves the last roller its turns are substantially cylindrical outside but still have a substantial degree of arch inside.

Figure 4:
Fig. 4 is a cross section on line 4—4 of Fig. 5, illustrating the shape first given to the strip.
Figure 10:
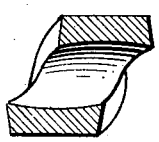
Fig. 10 is an axial section of one turn or convolution of a bearing roller in which the side edges are inclined.

It will be understood that the extent or magnitude of the bending and stretching of the metal in changing it from a form such as indicated in Fig. 4 to one such as indicated in Fig. 1, for example, depends upon a number of factors, among which I may mention the inherent stiffness of the metal, the width and thickness of the strip and the ratio of these dimensions, and the number, arrangement and configuration of the rolls. By varying one or more of the controlling factors the shape given to the strip can be varied, but in general I prefer to have the outer surface of the bearing roller as nearly cylindrical as possible, so that less metal will have to be taken off in the grinding operation usually employed to finish the roller. It will be observed that the sides of the strip shown in Fig. 4 are inclined, the section being essentially trapezoidal in form. The pressure against the rolls tends to bring the sides to parallelism, and may do so substantially completely, as in Fig. 1, or may even go further, giving at least one edge a slant in the opposite direction, as shown in Fig. 10, for example, with some exaggeration.

Figure 5:
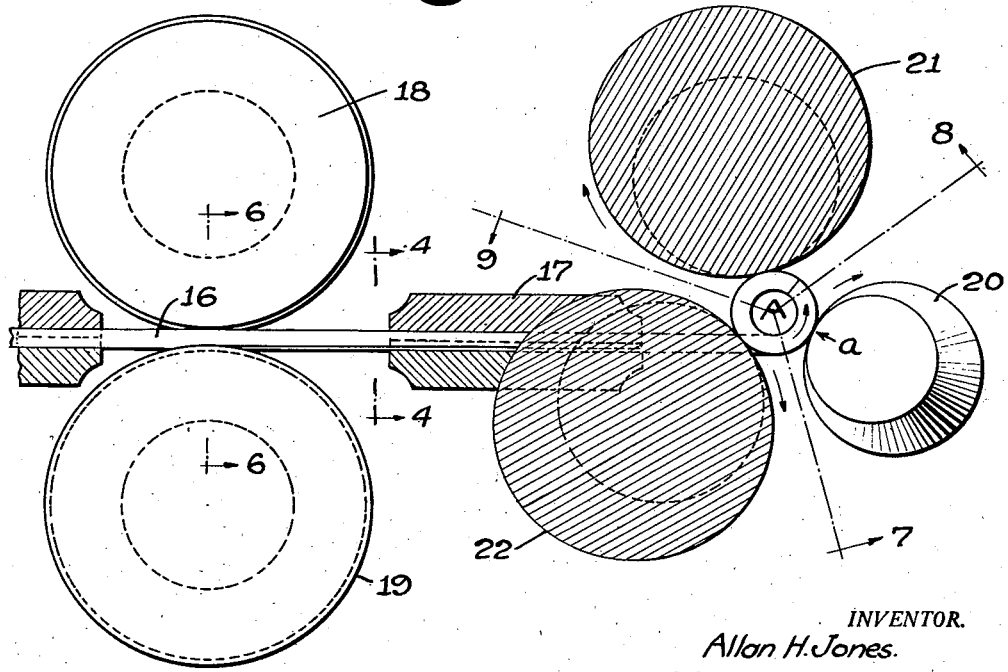
Fig. 5 is a cross sectional view illustrating diagrammatically an apparatus suitable for carrying out a method by which my improved roller can be produced.
Figure 6:
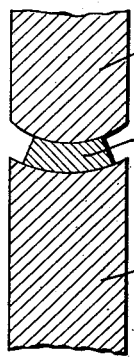
Fig. 6 is a cross section on line 6—6 of Fig. 5, showing the means by which the strip is given the shape illustrated in Fig. 4.

As the coiling proceeds, the helix issues axially from the rollers, that is, toward the observer looking at Fig. 5. In making cylindrical (or "straight") rollers the process is continuous and the helix is therefore limited in length only by the length of the strip which is to be coiled. Helixes thus made are cut up into sections of suitable length or lengths, which may be ground by any convenient means, not shown, to give a smooth and accurate outer surface. It is common practice, in coiling a strip to helical form, to wind the strip on a mandrel or arbor, but I have found such device unnecessary, especially for the larger sizes of bearing-rollers, and accordingly I prefer to do without it in a machine of the type illustrated, thereby eliminating the expense incident to the replacement entailed by wear or breakage of the mandrel, or both.

Figure 7:
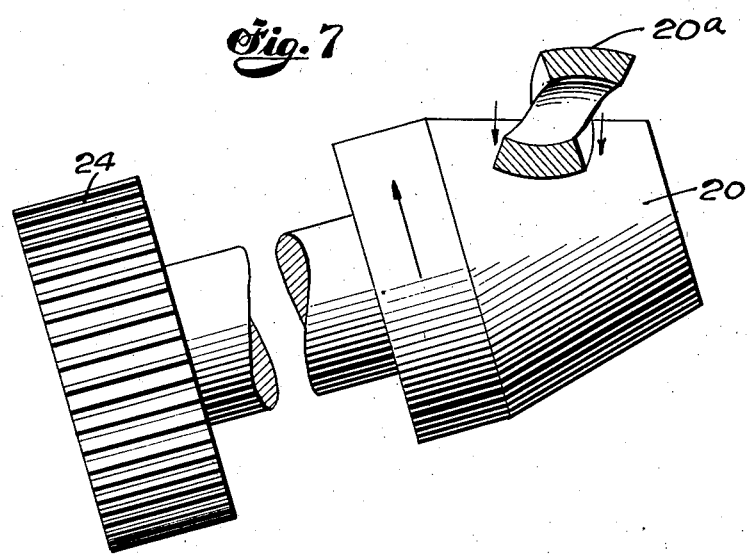
Figs. 7, 8 and 9 are elevational views, on lines $A^7$, $A^8$, and $A^9$, respectively, of Fig. 5, with the metal strip in cross section, illustrating the rollers employed in Fig. 5, and their operation upon the metal strip as the latter is coiled.

In the machine illustrated I have shown the pinion or gear 24, Fig. 7, as representing generally the use of gearing as a permissible and convenient means for driving one or more of the coiling and shaping rolls. The frame of the machine, the necessary bearings, etc., are omitted to avoid unnecessary complication, the provision of such parts being left to the designer who undertakes to apply the invention in practice. The skilled designer will also understand the effects produced by varying the shapes of the coiling rolls and by adjusting their spacing with respect to each other and to the axis of the helix, and their angular relation to said axis, etc., and will vary one or more of these factors as may be necessary or advantageous in the production of the particular bearing rollers desired.

It is to be understood that the invention is not limited to the specific features herein disclosed, but can be carried out in other ways without departure from its spirit.

I claim—

1. In the art of making bearing rollers by coiling a metal strip to helical form, the improvement comprising giving the strip an initial outwardly convex and inwardly concave form, and thereafter progressively bending the side portion of the coil outwardly and simultaneously contracting the outer portion of metal transversely, whereby the metal is thinned at the middle.

2. In the art of making bearing rollers by coiling a metal strip to helical form, the improvement comprising giving the strip an initial outwardly convex and inwardly concave form, and thereafter, by radially inward pressure on the intermediate portions of the strip, bending the side portions radially outward and contracting the outer portion of the metal transversely whereby the outer surface is flattened and the strip thinned at the middle.

3. In the art of making bearing rollers by coiling a metal strip to helical form, the improvement comprising giving the strip an initial outwardly convex and inwardly concave form; and thereafter, in the coiling operation, bending the side portions outwardly and simultaneously stretching the outer portion of the metal longitudinally until the coil is substantially cyindrical on the outside and outwardly arched inside.

4. In the art of making bearing rollers by coiling a metal strip to helical form, the improvement comprising giving the strip an initial outwardly convex and inwardly concave shape, and in bending the strip to helical form, causing radially inward pressure to be exerted on the intermediate portions of the turns of the strip to bend said intermediate portions inwardly and simultaneously stretch the outer portion of the metal longitudinally until the outer surface is substantially cylindrical and the inner surface is arched transversely of the strip.

5. The method of making a bearing roller of the type described, comprising giving the strip an initial outwardly convex and inwardly concave form, progressively coiling the strip of metal to helical form, and simultaneously by pressure exerted radially inwardly bending and stretching the metal strip, in each turn, to a form which is substantially cylindrical outside and transversely concave inside.

In testimony whereof I hereto affix my signature.

ALLAN H. JONES.